(12) United States Patent
McLachlan

(10) Patent No.: US 8,720,391 B2
(45) Date of Patent: May 13, 2014

(54) PRE-COMBUSTION CYCLE PRESSURISATION SYSTEM

(75) Inventor: Paul Anthony McLachlan, Christchurch (NZ)

(73) Assignee: Mace Engineering Limited, Christchurch (NZ)

( * ) Notice: Subject to any disclaimer, the term of this patent is extended or adjusted under 35 U.S.C. 154(b) by 180 days.

(21) Appl. No.: 13/262,429

(22) PCT Filed: Mar. 26, 2010

(86) PCT No.: PCT/NZ2010/000053
§ 371 (c)(1),
(2), (4) Date: Jan. 16, 2012

(87) PCT Pub. No.: WO2010/114393
PCT Pub. Date: Oct. 7, 2010

(65) Prior Publication Data
US 2012/0097142 A1  Apr. 26, 2012

(30) Foreign Application Priority Data

Mar. 30, 2009 (NZ) ........................ 575925

(51) Int. Cl.
*F01C 1/07* (2006.01)
*F02B 25/00* (2006.01)
*F02B 33/00* (2006.01)

(52) U.S. Cl.
USPC .................... 123/18 R; 123/65 V; 123/65 BA

(58) Field of Classification Search
USPC ... 123/18 R, 65 R, 73 R, 73 A, 73 AB, 73 PP, 123/65 PE, 65 A, 65 V, 65 VB, 65 VC, 65 VD, 123/65 P, 65 SP, 65 B, 65 BA
See application file for complete search history.

(56) References Cited

FOREIGN PATENT DOCUMENTS

| JP | 57081109 A | 5/1982 |
| JP | 4076213 A | 3/1992 |
| JP | 5321673 A | 12/1993 |
| JP | 10325320 A | 12/1998 |

OTHER PUBLICATIONS

International Search Report for PCT/NZ2010/000053 mailed Jun. 11, 2010, 2 pages.

*Primary Examiner* — Noah Kamen
(74) *Attorney, Agent, or Firm* — Merchant & Gould P.C.

(57) ABSTRACT

A two stroke internal combustion engine (1) incorporating an asymmetric exhaust port/transfer port inversion device (2) characterized in that the device includes a hollow flap valve (100) adapted to pivot about a hollow pivot shaft (101) between a closed position and an open position wherein pivoting the device (2) to the open position as the piston (3) begins the compression stroke allows the transfer of air to continue after the leading edge of the piston has closed off the exhaust port (105) thereby advancing the timing of the exhaust port closing and extending the duration of air transfer from the crankcase primary compression chamber (103).

11 Claims, 6 Drawing Sheets

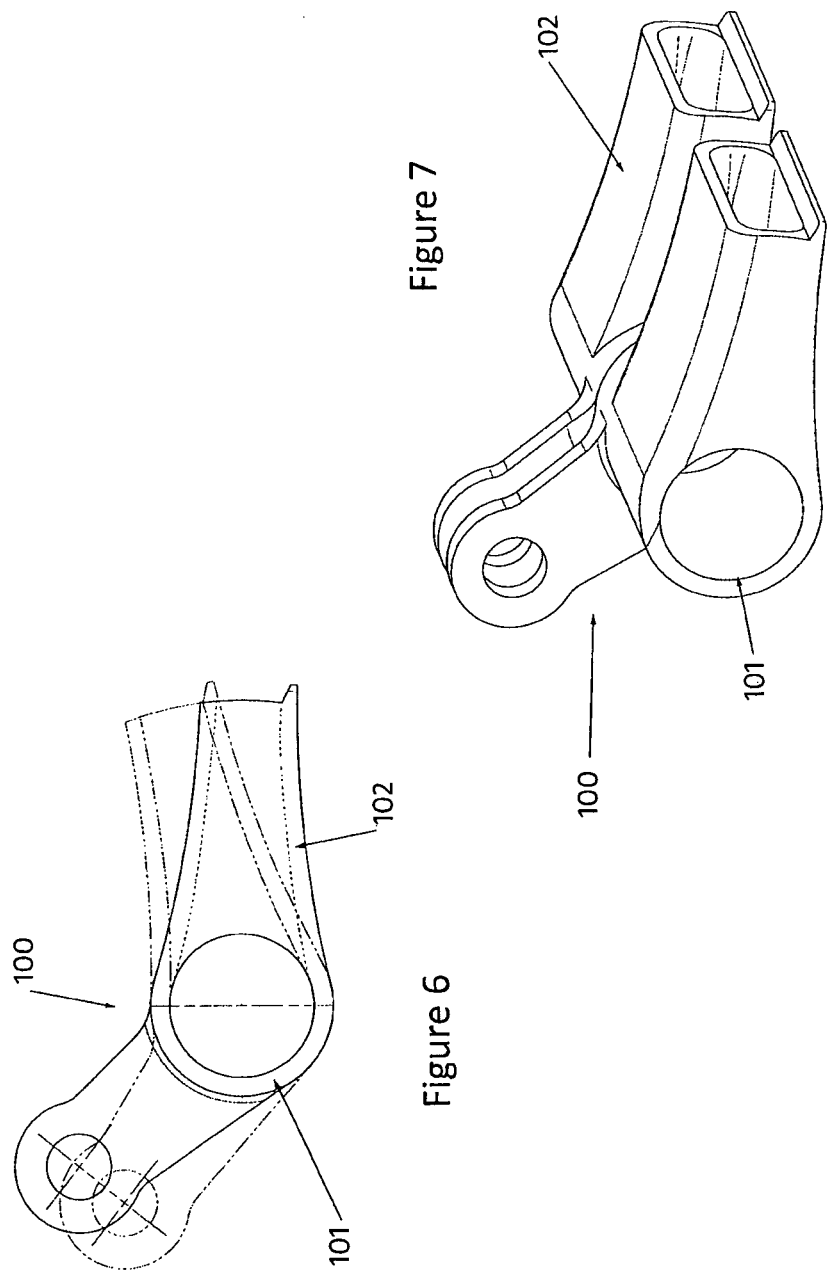

PRE-COMBUSTION CYCLE PRESSURISATION SYSTEM

This application is a National Phase Application of PCT/NZ2010/000053 filed Mar. 26, 2010, which claims priority to New Zealand Patent Application No. NZ575925, filed Mar. 30, 2009, the disclosures of which are incorporated herein by reference in their entireties.

FIELD OF THE INVENTION

This invention relates to improvements in and to internal combustion engines. More particularly, but not exclusively, this invention comprises improvements in and to a pre-combustion cycle pressurisation system for use in two stroke internal combustion engines.

BACKGROUND

In International Patent Specifications WO 95/08055 and WO 01/71160, the to contents of which are incorporated herein by reference, there are described internal combustion engines which utilise a pivoted piston which rocks about a pivot point within a combustion chamber. The piston is connected adjacent the end of the piston remote from the pivot point to a connecting rod which drives a crankshaft. The piston has a first arcuate sealing surface to seal against a wall of the combustion chamber and a second sealing surface which is connected by a piston floor to the first arcuate sealing surface. Both sealing surfaces have a substantially constant radial dimension from the pivot point of the piston.

The first arcuate sealing surface forms a skirt so a portion of the wall of the arcuate sealing surface will make a gas seal with the wall of the combustion chamber. The skirt also assists in dissipating heat in the piston. The piston further includes an arrangement to allow liquid coolant to pass through the pivot shaft, through liquid cooling galleries in the piston and out of the pivot shaft.

A particular area of difficulty with prior art two stroke engine configurations, both of the type noted above, but also more conventional designs which utilise a piston which reciprocates up and down within a circular cylinder bore, is in maximising pre-combustion cycle pressurisation of the combustion charge.

OBJECT OF THE INVENTION

It is an object of this invention to provide a solution to the above identified problem with prior art engine configurations, or to at least provide the public with a useful choice.

SUMMARY OF THE INVENTION

Accordingly in a first broad aspect the invention may be said to comprise an asymmetric exhaust port/transfer port inversion device for a two stroke internal combustion engine wherein the device includes a hollow flap valve adapted to pivot about a hollow pivot shaft between a closed position and an open position wherein pivoting the device to the open position as the piston begins the compression stroke allows the transfer of air to continue after the leading edge of the piston has closed off the exhaust port thereby advancing the timing of the exhaust port closing and extending the duration of air transfer from the crankcase primary compression chamber.

According to a second broad aspect the invention comprises a two stroke internal combustion engine incorporating the asymmetric exhaust port/transfer port inversion device of the first broad aspect above.

Preferably the leading edge of the flap valve of the asymmetric exhaust port/transfer port inversion device is shaped to seal against the cylinder wall in the case of a conventional, round sliding two stroke piston engine or, alternatively, to seal against the sealing surfaces of the piston of a two stroke design substantially according to that described in WO 95/08055 and WO 01/71160.

Optionally the air supply to the asymmetric exhaust port/transfer port inversion device is supplied via a direct alternative supply. This supply may come from a compressor powered either electrically or mechanically from the engine.

Preferably the two stroke internal combustion engine according to this aspect utilises a pivoted piston which rocks within a crankcase about a pivot point within a combustion chamber, the piston being connected adjacent the end of the piston remote from the pivot point to a connecting rod which drives a crankshaft.

Further preferably the, or each, piston has a first arcuate sealing surface to seal against a wall of the combustion chamber and a second sealing surface which is connected by a piston floor to the first arcuate sealing surface, both sealing surfaces having a substantially constant radial dimension from the pivot point of the piston, and wherein the first arcuate sealing surface forms a skirt so a portion of the wall of the arcuate sealing surface will make a gas seal with the wall of the combustion chamber.

Still further preferably the, or each, piston of the two stroke internal combustion engine includes an arrangement to allow liquid coolant to pass through the pivot shaft, through liquid cooling galleries in the piston and out of the pivot shaft.

Desirably the engine further includes a duct in the combustion chamber side wall to enable communication between the crankcase and the hollow valve pivot shaft of the asymmetric exhaust port/transfer port inversion device.

Alternatively access to an air supply can be achieved via porting in the opposing side of the pivot shaft of the asymmetric exhaust port/transfer port inversion device.

Preferably the asymmetric exhaust port/transfer port inversion device is actuated either by a cam mechanism, or by an electro-magnetic or pneumatic control to open and close the device through a limited degree of crankshaft revolution.

Preferably the actuation of the asymmetric exhaust port/transfer port inversion device is adjustably operable to enable variable timing control.

Through pivoting the device to the open position as the piston begins the compression stroke the transfer of air can continue after the leading edge of the piston has closed off the exhaust port. The consequence of this is that a supercharger can continue to pressurize the chamber after the exhaust port has effectively closed. This provides the ability to operate the engine at high pressures or high load.

BRIEF DESCRIPTION OF THE DRAWINGS

The invention will now briefly be described with the aid of the accompanying drawings, of which:

FIG. 6: shows a side elevation of the asymmetric valve from FIGS. 1 to 5; and

FIG. 7: show a perspective view of the asymmetric valve of FIG. 6.

DESCRIPTION OF THE PREFERRED EMBODIMENTS

The two stroke engine design disclosed in International Patent Specifications WO 95/08055 and WO 01/71160 include pistons which are pivoted within a combustion chamber by a pivot pin and each have an arcuate first sealing surface which forms a skirt to the piston.

The prior art pistons also include a second arcuate sealing surface which is radially offset from the skirt with both the surface of the skirt and the second arcuate sealing surface describing a circumferential path about the pivot axis of the pivot pin. Each piston also includes a piston pin to receive an end of a connecting rod, by which the crankshaft of the engine is rotated.

This invention is directed to providing an asymmetric exhaust port/transfer port inversion device for a two stroke internal combustion engine. A preferred embodiment is illustrated in FIGS. 6 and 7, with its mode of operating and integration within the engines generally described and illustrated in International Patent Specifications WO 95/08055 and WO 01/71160, and as illustrated in FIGS. 1 to 5.

Figure 1:
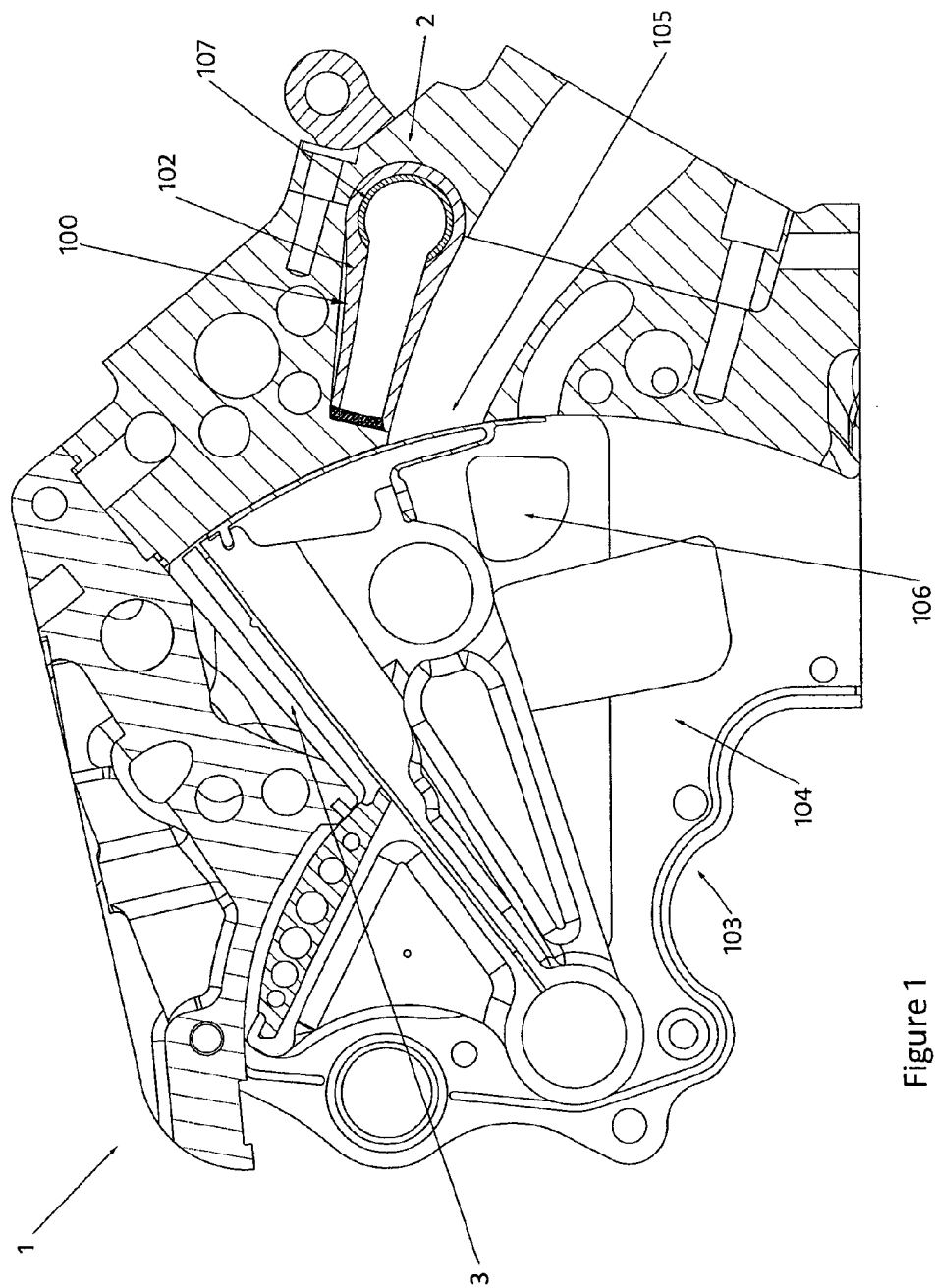
FIG. 1: shows a sectional side elevation through a combustion chamber of an internal combustion engine according to the present invention incorporating an asymmetric valve, with the piston at top dead centre.
Figure 3:
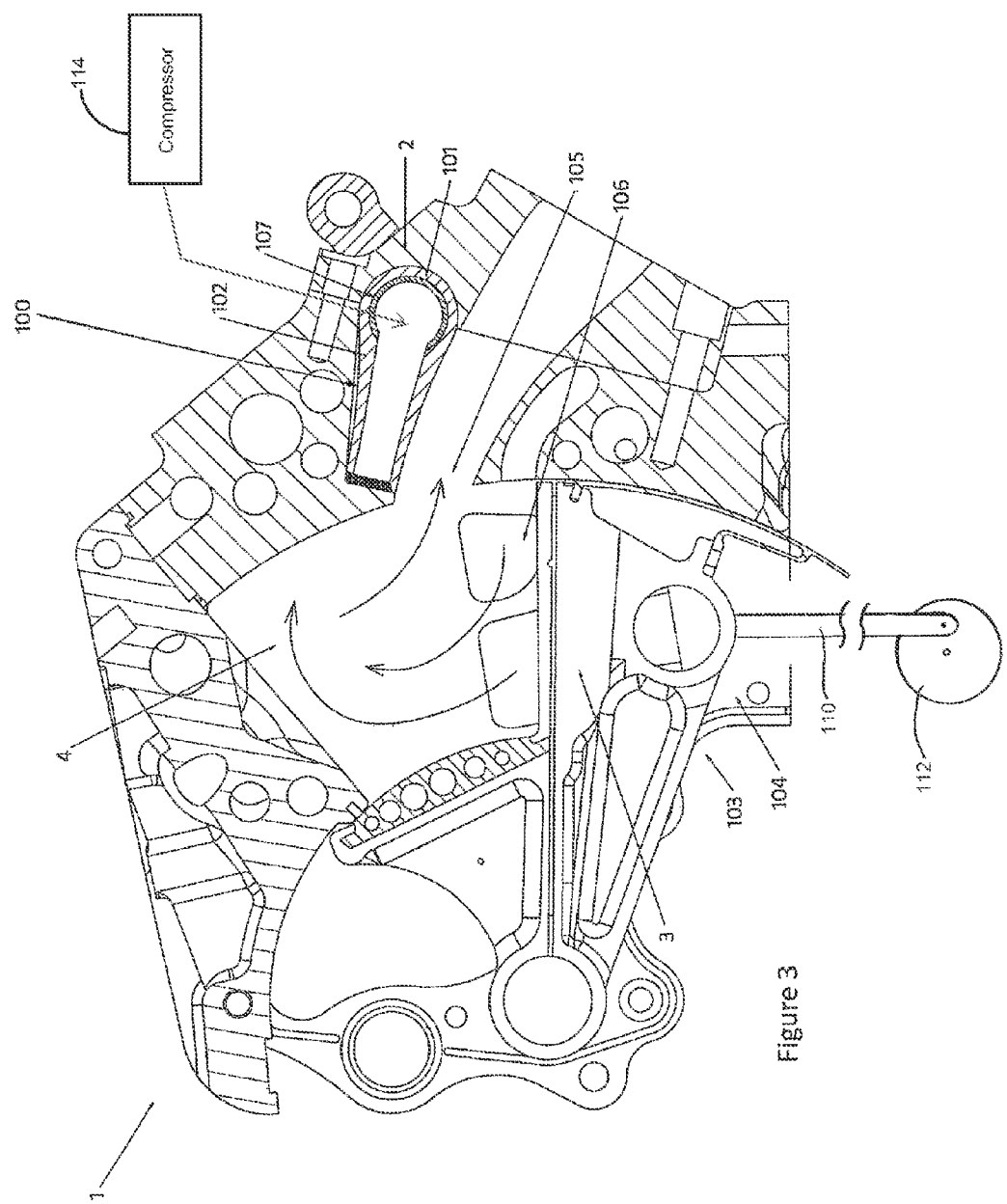
FIG. 3: again shows a similar view to that depicted in FIG. 1, but with the piston at bottom dead centre, and the combustion chamber being recharged with a fresh charge via the side intake ports.
Figure 4:
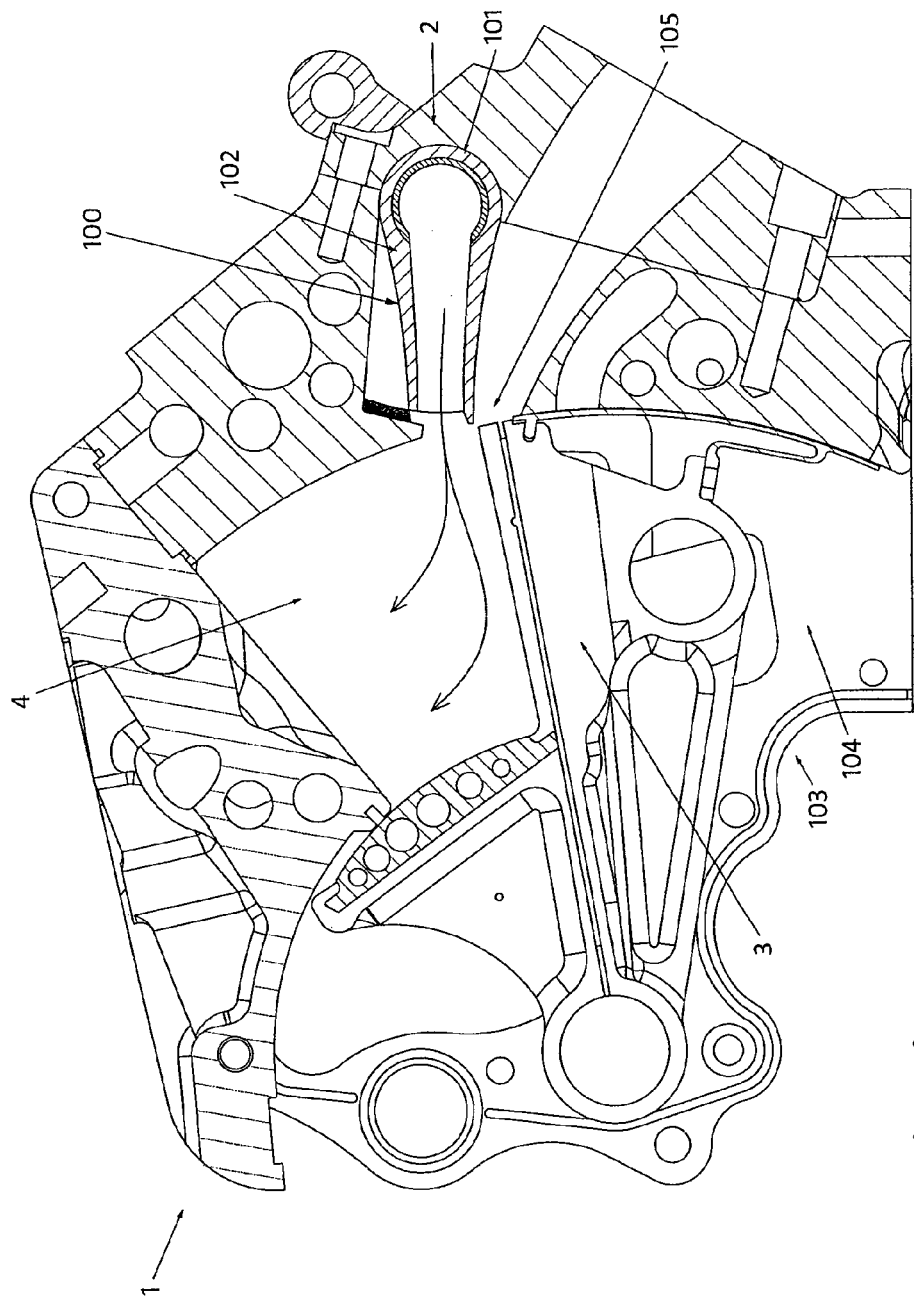
FIG. 4: again shows a similar view to that depicted in FIG. 1, but this time with the piston on the upstroke commencing to pressurise the charge in the chamber as it has passed, and therefore closed off the intake ports, but with the asymmetric valve fully open and able to further add to the combustion charge.

As can be seen in the drawings, the two stroke engine as generally indicated at 1 incorporates an asymmetric exhaust port/transfer port inversion device as generally indicated at 2 which includes a hollow flap valve as generally indicated at 100, adapted to rock about a hollow pivot shaft 101. The valve 100 alternates between a closed position, as shown in FIG. 1, and an open position, as shown in FIG. 4. Also, in FIG. 4, the asymmetry of the valve is most apparent, as one side of the valve (in section) is longer than the other. This asymmetry is also depicted in FIGS. 6 and 7. FIG. 3 depicts a connecting rod 110 that drives a crankshaft 112.

The valve 100 has a hollow elongate body 102, the interior of which communicates with the interior of the hollow pivot shaft 101. Air or air/fuel mix can be supplied to the hollow pivot shaft 101 from a duct through from the crankcase 103 via the combustion chamber side plate 104. Alternatively, air or air/fuel mix can be supplied from a device such as a supercharger or compressor 114, as depicted in FIG. 3.

Stepwise operation of the device is serially illustrated in FIGS. 1 to 5.

The relative component positions are shown at top dead centre in FIG. 1, with the valve in the closed position.

Figure 2:
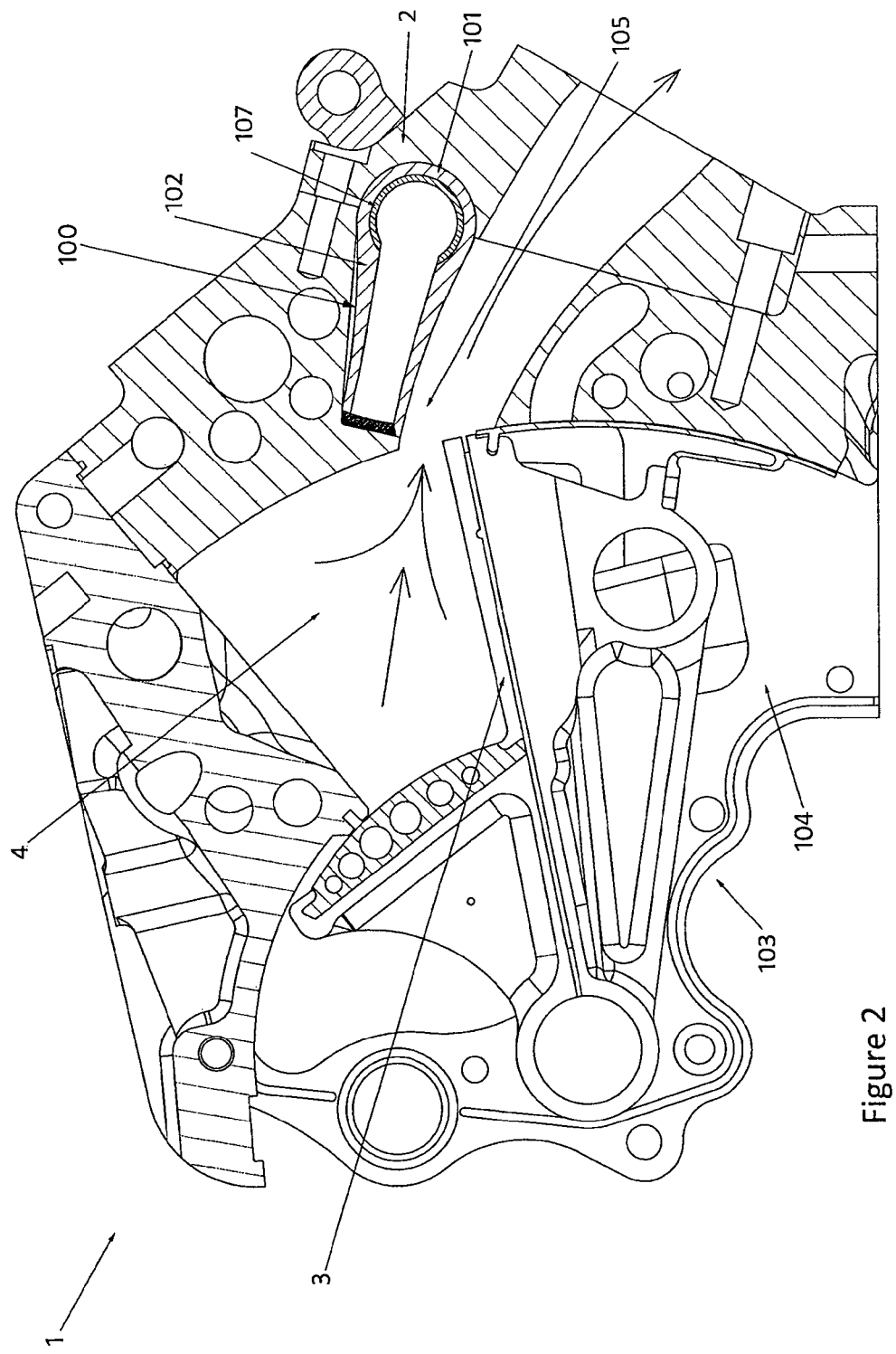
FIG. 2: shows a similar view to that depicted in FIG. 1, but with the piston on power stroke, and just passing the opening point of the exhaust port.

As the piston 3 moves through the power stroke it passes the exhaust port 105. As FIG. 2 illustrates, at that point the valve 100 is closed, and exhaust gas starts to exist the combustion chamber 4.

At bottom dead centre the combustion chamber 4 begins recharging, drawing in a fresh charge via the side intake ports 106 as illustrated in FIG. 3.

As shown in FIG. 4, as the piston 1 rises it passes and closes off the intake ports 106. At this point the valve 100 opens to allow the transfer of combustion charge into the combustion chamber 4 to continue after the leading edge of the piston 3 has closed off the exhaust port 105, thereby advancing the timing of the exhaust port closing and extending the duration of air transfer from the crankcase primary compression chamber or from a supercharger to pressurize the chamber after the exhaust port has effectively closed. This provides the ability to operate the engine at high pressures or high load.

Figure 5:
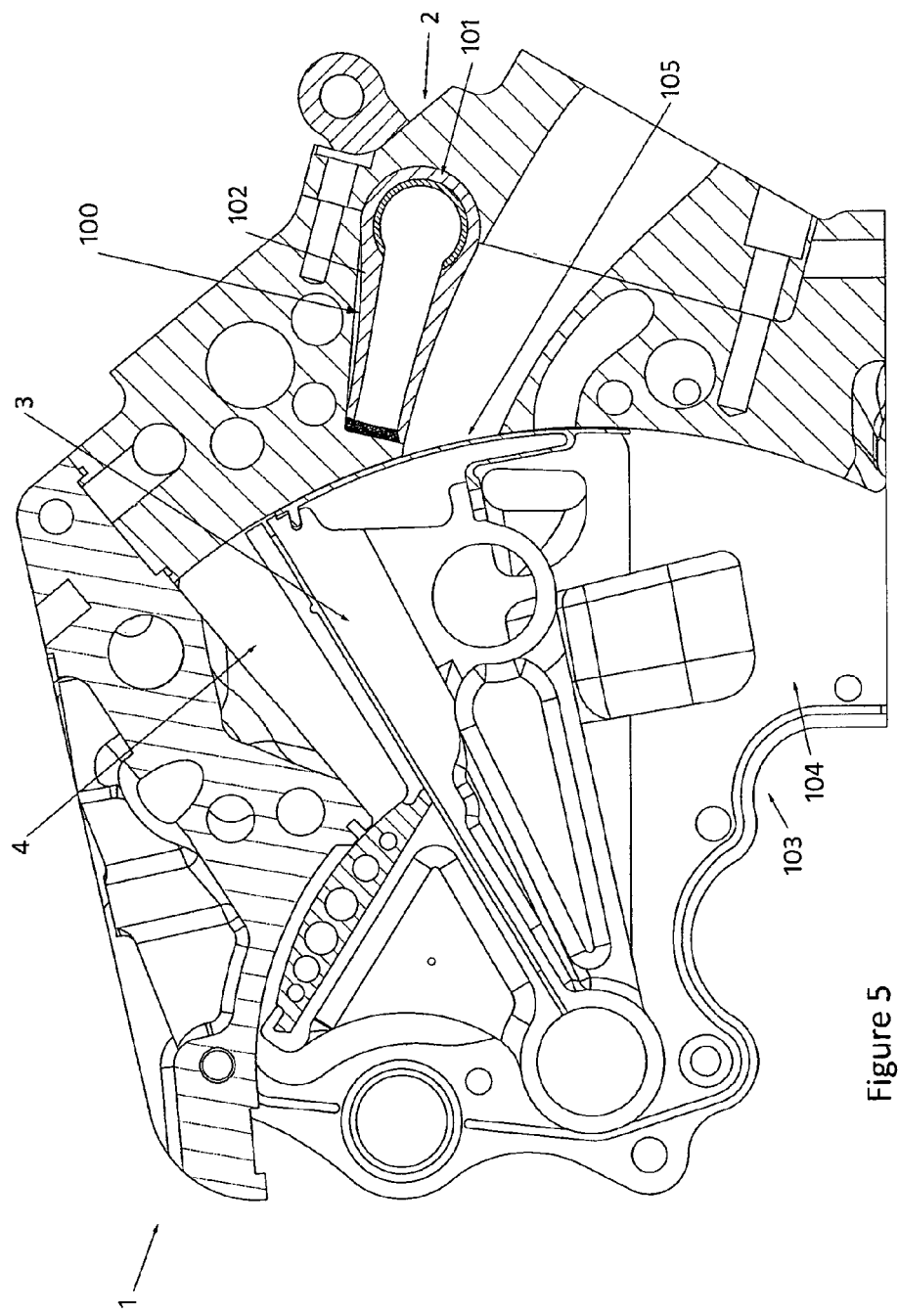
FIG. 5: also shows a similar view to that depicted in FIG. 1, but with the piston in compression stroke, now passed asymmetric valve, which has reverted to a closed position.

FIG. 5 also shows a similar view to that depicted in FIG. 1, but with the piston 3 in compression stroke, now passed asymmetric valve 100, which has reverted to a closed position.

Advantages of this feature of the present invention include its simplicity, light weight and that it is fast acting. Most importantly is its ability to open, allowing the ongoing transfer of a combustion charge into the combustion chamber 4, while at the same time closing off the exhaust port 105. Prior art two-stroke exhaust shutter valves have closed the exhaust port only.

As the device 2 must be opened and closed through a limited degree of crankshaft revolution it is operated by a standard cam mechanism driven from the crankshaft, however, it could equally be driven by an electro-magnetic or pneumatic controlled mechanism. The device can include the potential for variable timing control.

A further advantage of this device is that it overcomes the fixed and symmetrical port open and closing of the conventional piston port two-stroke design. A prior art porting layout typically has the exhaust port opening first and therefore being the last port to close as the piston returns on the compression stroke. This inhibits the ability to pressurise the chamber with a supercharger.

While the design of this feature is particularly suited to the engine described and illustrated in International Patent Specifications WO 95/08055 and WO 01/71160 as it can effectively seal to the piston skirt, both being straight surfaces. However, the technology can also be applied to a conventional, round sliding piston engine design although the shape of the leading edge of the device will be more complex.

Having read the specification, it will be apparent to those skilled in the art that various modifications and amendments can be made to the construction and yet still come within the general concept of the invention. All such modifications and changes are intended to be included within the scope of the claims.

The invention claimed is:

1. An internal combustion engine comprising a port inversion device comprising:
    a crankcase primary compression chamber having an exhaust port;
    a piston movable within the crankcase primary compression chamber;
    a hollow flap valve adapted to pivot about a hollow pivot shaft between a closed position and an open position;
    wherein pivoting the port inversion device to the open position as the piston begins a compression stroke allows a transfer of air to continue after a leading edge of the piston and the hollow flap valve have closed off the exhaust port.

2. The two stroke internal combustion engine of claim 1, wherein the port inversion device is adapted to be sourced from a compressor powered either electrically or mechanically from the two stroke internal combustion engine.

3. The two stroke internal combustion engine of claim 1, wherein the engine utilizes a pivoted piston which rocks within a crankcase about a pivot point within a combustion chamber, the piston being connected adjacent the end of the piston remote from the pivot point to a connecting rod which drives a crankshaft.

4. The two stroke internal combustion engine of claim 3, wherein the piston has a first arcuate sealing surface to seal against a wall of the combustion chamber and a second arcuate sealing surface which is connected by a piston floor to the first arcuate sealing surface, both sealing surfaces having a substantially constant radial dimension from the pivot point of the piston, and wherein the first arcuate sealing surface forms a skirt so a portion of the wall of the first arcuate sealing surface will make a gas seal with the wall of the combustion chamber.

5. The two stroke internal combustion engine of claim 1, wherein an intake port in a combustion chamber side wall enables communication between a crankcase and the hollow pivot shaft of the port inversion device.

6. The two stroke internal combustion engine of claim 1, wherein an access to an air supply can be achieved via porting in an opposing side of the pivot shaft of the port inversion device.

7. The two stroke internal combustion engine of claim 1, wherein the port inversion device is actuated either by a cam mechanism, or by an electro-magnetic or pneumatic control to open and close the port inversion device through a limited degree of crankshaft revolution.

8. The two stroke internal combustion engine of claim 7 wherein actuation of the port inversion device is adjustably operable to enable variable timing control.

9. The two stroke internal combustion engine of claim 1, wherein the port inversion device is operable so that as the piston begins the compression stroke the transfer of air can continue after the leading edge of the piston has at least partially closed off the exhaust port.

10. The two stroke internal combustion engine of claim 9 wherein the port inversion device continues to pressurize a chamber after the exhaust port has at least partially closed so as to enable the two stroke internal combustion engine.

11. The two stroke internal combustion engine of claim 1, wherein the port inversion device is asymmetric.

* * * * *